(12) United States Patent
Linde et al.

(10) Patent No.: US 10,994,832 B2
(45) Date of Patent: May 4, 2021

(54) RIBLET FILM FOR REDUCING THE AIR RESISTANCE OF AIRCRAFT

(71) Applicant: Airbus Operations GmbH, Hamburg (DE)

(72) Inventors: Peter Linde, Hamburg (DE); Matthias Hegenbart, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 272 days.

(21) Appl. No.: 16/051,562

(22) Filed: Aug. 1, 2018

(65) Prior Publication Data
US 2019/0047684 A1    Feb. 14, 2019

(30) Foreign Application Priority Data
Aug. 10, 2017  (DE) .......................... 102017118257.8

(51) Int. Cl.
| B64C 21/10 | (2006.01) |
| B64F 5/60 | (2017.01) |
| G01N 27/85 | (2006.01) |
| F15D 1/12 | (2006.01) |
| F15D 1/00 | (2006.01) |
| B32B 3/30 | (2006.01) |
| B32B 7/12 | (2006.01) |

(52) U.S. Cl.
CPC ................ B64C 21/10 (2013.01); B64F 5/60 (2017.01); F15D 1/004 (2013.01); F15D 1/12 (2013.01); G01N 27/85 (2013.01); B32B 3/30 (2013.01); B32B 7/12 (2013.01); B32B 2264/105 (2013.01); B32B 2307/208 (2013.01); B32B 2605/18 (2013.01); B64C 2230/26 (2013.01)

(58) Field of Classification Search
CPC ........... B64C 21/10; F15D 1/004; F15D 1/12; G01N 27/85; B32B 3/30; B32B 7/12; B32B 2264/105; B32B 2307/208; B32B 2230/26

See application file for complete search history.

(56) References Cited

U.S. PATENT DOCUMENTS

| 3,845,382 A | 10/1974 | Foerster |
| 5,133,516 A | 7/1992 | Marentic et al. |
| 8,733,702 B1 * | 5/2014 | Rawlings .............. B64C 23/005 156/230 |

(Continued)

FOREIGN PATENT DOCUMENTS

| DE | 60314775 | 4/2008 |
| GB | 668732 | 12/1938 |
| WO | 2009019246 | 2/2009 |

OTHER PUBLICATIONS

German Search Report, dated Apr. 11, 2018, priority document.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

A riblet film for reducing the air resistance of aircraft, comprising a suspension with magnetic particles enclosed therein. Depending on the pattern of a magnetic field acting on the riblet film, the magnetic field that is acting can be made visible, at least in certain regions, by changing the orientation of the magnetic particles. The riblet film allows an inspection of the aircraft structure located under the riblet film through the riblet film.

20 Claims, 3 Drawing Sheets

(56) References Cited

U.S. PATENT DOCUMENTS

| | | | | |
|---|---|---|---|---|
| 2003/0152766 A1* | 8/2003 | Vargo | ............ | B32B 7/12 |
| | | | | 428/343 |
| 2004/0126541 A1 | 7/2004 | Dietz et al. | | |
| 2007/0194178 A1* | 8/2007 | Lang | ............ | F15D 1/12 |
| | | | | 244/130 |
| 2010/0187359 A1* | 7/2010 | Rawlings | ............ | F15D 1/004 |
| | | | | 244/130 |
| 2011/0073710 A1* | 3/2011 | Rawlings | ............ | F15D 1/12 |
| | | | | 244/130 |
| 2011/0186685 A1* | 8/2011 | Tsotsis | ............ | F15D 1/12 |
| | | | | 244/130 |
| 2011/0262705 A1* | 10/2011 | Gupta | ............ | B64C 21/10 |
| | | | | 428/156 |
| 2011/0274875 A1* | 11/2011 | Lang | ............ | B64C 21/10 |
| | | | | 428/119 |
| 2014/0272237 A1* | 9/2014 | Roper | ............ | C09D 5/20 |
| | | | | 428/41.8 |
| 2018/0009136 A1* | 1/2018 | Rawlings | ............ | B32B 27/288 |
| 2019/0202547 A1* | 7/2019 | Wu | ............ | F15D 1/12 |

* cited by examiner

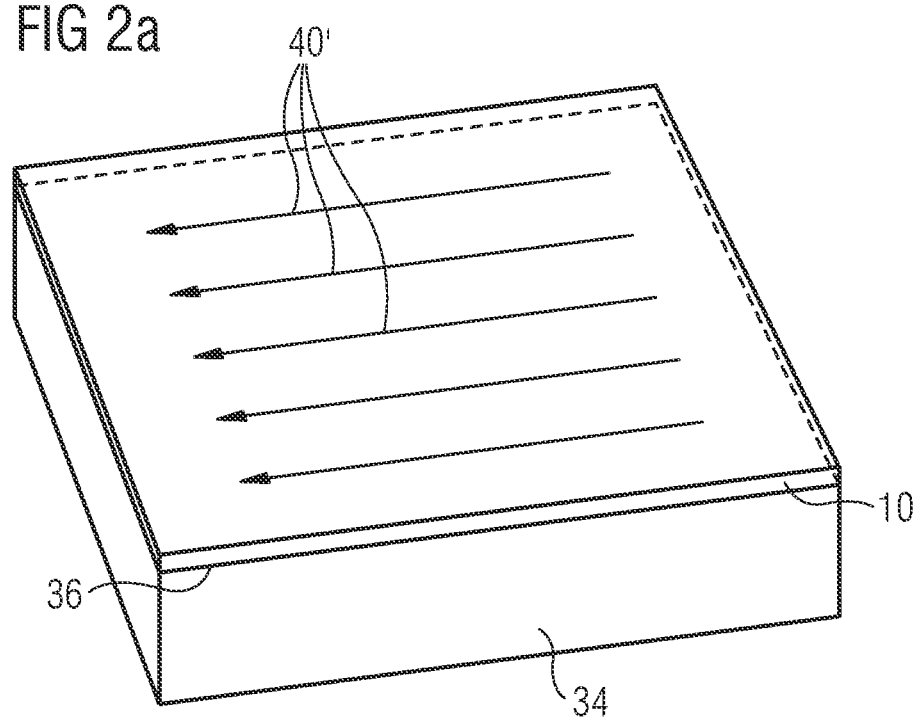
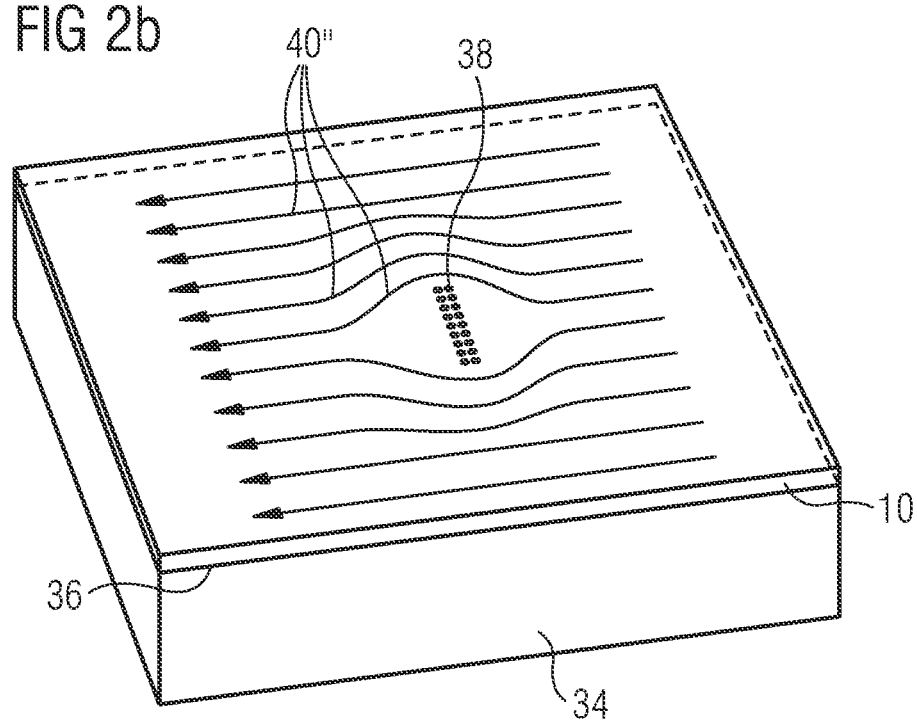

RIBLET FILM FOR REDUCING THE AIR RESISTANCE OF AIRCRAFT

CROSS-REFERENCES TO RELATED APPLICATIONS

This application claims the benefit of the German patent application No. 10 2017 118 257.8 filed on Aug. 10, 2017, the entire disclosures of which are incorporated herein by way of reference.

FIELD OF THE INVENTION

The invention relates to a riblet film for reducing the air resistance of aircraft, to an aircraft with such a riblet film and to a method for examining an aircraft structure to which such a riblet film has been applied.

BACKGROUND OF THE INVENTION

The term "riblets" refers to profiled bodies on surfaces that take the form of an arrangement of microscopically small grooves or ribs. The use of riblets on flow surfaces of aircraft serves for reducing the flow resistance, and consequently for reducing the fuel consumption.

A way of applying riblets to aircraft is to produce so-called riblet films, which comprise the riblets, and apply them to the (aerodynamic) surface at the places on the aircraft where corresponding reductions of the flow resistance are desired.

However, it may be disadvantageous when using such riblet films that the riblet films generally cover the aerodynamic surface to which they are applied, and thereby restrict the view of the aircraft surface structure lying thereunder in these regions. Consequently, visual checks of the structure are not always readily possible in these regions. This can make it more difficult to carry out maintenance tasks, and therefore at least locally restrict the use of riblet films.

An object of the present invention is to provide a riblet film that eliminates or at least mitigates the disadvantages of the prior art.

SUMMARY OF THE INVENTION

An object of the invention is achieved by a riblet film for reducing the air resistance of aircraft comprising a suspension which has magnetic particles enclosed therein, wherein, depending on the pattern of a magnetic field acting on the riblet film, the magnetic field that is acting can be made visible, at least in certain regions, by changing the orientation of the magnetic particles.

In the case of the riblet film according to the invention, the suspension with the magnetic particles enclosed therein acts as a so-called flux detector. The suspension is, in this case, a substance with a carrier liquid and magnetic, freely rotatable particles contained therein. The effect of the flux detector is based on the fact that the orientation of the freely rotatable particles is dependent on whether the externally generated magnetic field impinges on the plane of the flux detector substantially orthogonally or substantially parallel thereto. If the magnetic field impinges on the flux detector orthogonally, the magnetic particles orient themselves in such a way that they only reflect a small part of light. Consequently, the flux detector looks comparatively dark. By contrast, if the magnetic field extends parallel to the plane of the flux detector, the magnetic particles act like small mirrors, whereby the flux detector looks bright. Depending on the number of magnetic particles there are in the suspension, a finely structured display of the magnetic field can therefore be provided. It goes without saying that the effect described above of the reflection of light impinging on the magnetic particles also occurs in principle at all other (intermediate) angles and brings about correspondingly variable bright/dark variations.

By itself acting to a certain extent as a flux detector, the riblet film according to the invention, on one side of which a multiplicity of riblets (riblets formed as very small ribs) are arranged, can advantageously make irregularities in the structure to which the riblet film has been applied visible when a magnetic field acts at least locally on the structure and on the riblet film. This is because irregularities in the structure, such as, for example, cracks or other disturbances, influence the pattern of the magnetic field lines under the influence of a magnetic field acting on this structural region. The influencing is such that the pattern of the magnetic field lines in the region of the structural irregularity is generally different than would be expected without the irregularity (for example without the crack) (the pattern of the actual magnetic field deviates from the expected pattern of the desired magnetic field).

Therefore, the riblet film according to the invention allows, for example, irregularities in the structure to be made visible for maintenance purposes even though they possibly would not be perceptible when simply viewed from the outside through the riblet film (even if the riblet film is made to be transparent, because, for example, a crack has developed under the surface of the structure). The riblet film according to the invention allows cracks that have possibly occurred in the structure lying thereunder to be detected or made visible (if the depth of penetration of the magnetic film is sufficient). The use or application of riblet films is thereby facilitated.

In other words, the riblet film according to the invention for reducing the air resistance of aircraft comprises riblets arranged parallel to one another, formed on one side of the film, and a suspension with magnetic particles enclosed therein. Typical sizes of riblets may for example vary as follows: riblet height (from riblet base to riblet tip) between 0.01 mm and 0.04 mm; riblet width (averaged) between 0.005 and 0.02 mm. Commonly used distances between neighboring riblets may be for example between 0.02 mm and 0.08 mm.

The riblet film according to the invention has a film thickness of about 0.05 mm to 0.25 mm (riblet height not included). It goes without saying that these figures may differ depending on the region where it is applied (i.e., depending on where on the aircraft the riblet film is arranged or what flow velocity regime there is). The riblet film is typically formed as flexible and transparent or translucent. The film material may for example be selected from the group of the following plastics: PET (polyethylene terephthalate), PBT (polybutylene terephthalate), PEN (polyethylene naphtholate), PP (polypropylene), PA (polyamide) and PE (polyethylene). Within the scope of the invention, a suspension is understood as meaning a substance comprising a carrier liquid and magnetic, freely rotatable particles contained therein.

In the case of a preferred embodiment of the riblet film, it comprises a layer with a multiplicity of microcapsules, wherein the suspension is distributed among the microcapsules and respectively enclosed therein. The microcapsules among which the suspension is distributed allow a better orientation of the magnetic particles within the microcapsules to be achieved. The fact that the magnetic particles can therefore freely rotate more easily in the interior of the capsules means that the sensitivity of the riblet film according to the invention in the optical display of magnetic fields can be increased. Also, the magnetic particles can then, in principle, change their position in the interior of the microcapsules more easily and quickly. The suspension may, for example, be an oil and/or is preferably gelatinous. The magnetic particles may, for example, be nickel, iron and/or chromium-iron particles. The magnetic particles are then suspended in the oil or in the gelatinous carrier liquid in the interior of the microcapsules. The magnetic particles may for example be formed as so-called "flakes." Within the scope of the invention, a suspension is understood as meaning a substance comprising a carrier liquid and magnetic, freely rotatable particles contained therein. The layer with the microcapsules may likewise be selected from the group of the aforementioned plastics.

In the case of another advantageous embodiment of the riblet film, the magnetic particles comprise colloidal nickel. Colloidal nickel exhibits an advantageously rapid response at the field strengths to be used of the magnetic fields to be introduced. The magnetic particles formed in this way respond to changes in the magnetic field particularly easily and are therefore particularly suitable for making irregularities in the structure lying under the riblet film visible.

Also preferred is an embodiment of the riblet film in which the suspension and/or the layer comprising the microcapsules has/have been applied to a substrate serving as a carrier film. The substrate serving as a carrier film has the effect of additionally providing the riblet film according to the invention with stability, tear strength and robustness.

Also advantageous is an embodiment which is characterized in that the riblets are formed as ribs which are arranged substantially parallel to one another and have tips. In this way, the riblet films according to the invention have the advantageous effect of a great reduction of the air resistance of the aerodynamic surfaces that are provided with the riblet film. The riblet films are generally arranged on the aerodynamic surfaces in such a way that the flow runs parallel to the riblets.

In the case of a likewise preferred embodiment, the riblets have a substantially triangular cross section. Such a cross-sectional form of the riblets is advantageous with regard to the effective reduction of resistance of the aerodynamic surface that is provided with the riblet film.

It is furthermore preferred that the riblet film also has an adhesive layer for adhesively attaching the riblet film onto an aerodynamic surface. In this way, attachment of the film according to the invention is made possible on an industrial scale. The film can be processed comparatively easily, for example helped by a film that is stored flat and horizontal. It also makes it possible for the riblet film to be easily used on curved aerodynamic surfaces and prevents the aerodynamic surface from being damaged when riblets are applied. Alternatively, the riblet film according to the invention may itself be formed as an adhesive film, without an additional adhesive layer being provided.

An object of the invention is also achieved by an aircraft with a riblet film formed according to the invention which has been applied to an aerodynamic surface of the aircraft. Such an aircraft substantially makes use of the same advantages that the riblet film according to the invention exhibits. That is to say that, in the case of such an aircraft, it is possible by locally introducing a magnetic field into the region of the structure provided with the film to make irregularities that are possibly present in the structure visible by means of a changed magnetic field, even though the structure is covered with the riblet film. This is even possible whenever the riblet film according to the invention itself is not transparently designed or if the irregularity is somewhat deeper in the structure and would not be externally visible even without the riblet film.

An object of the invention is finally likewise achieved by a method for examining an aircraft structure to which a riblet film according to the invention has been applied, wherein the method comprises the following method steps:

generating a magnetic field, making the magnetic field act locally on the aircraft structure to be examined, displaying the generated magnetic field by means of the riblet film, and evaluating the magnetic field displayed. The method according to the invention advantageously allows irregularities in the structure to which the riblet film has been applied to be made visible. In comparison with the case where there are no irregularities in the structure, the presence of the structural irregularity (for example, cracks or other kinds of changes in the material such as the effects of fatigue) changes the pattern of the magnetic field lines in the region of the irregularity. Therefore, when there is any deviation of the local pattern of the magnetic field that is displayed by the riblet film from an expected pattern of the magnetic field, it can be deduced whether or not a structural irregularity is present. If required, a more detailed examination of the structure may subsequently be performed by means of other methods of examination. The method of examination according to the invention has the effect that the maintenance of aircraft is made easier and quicker. In the case of a preferred variant of the method, for the evaluation the actual magnetic field displayed is compared with a desired magnetic field.

The aspects described above and further aspects, features and advantages of the invention can likewise be taken from the examples of the embodiment, which is described below with reference to the accompanying drawings.

BRIEF DESCRIPTION OF THE DRAWINGS

In the figures, the same reference signs are used for elements, components or aspects that are the same or at least similar. It is noted that there follows a detailed description of an embodiment that is merely illustrative and not restrictive. In the claims, the word "comprising" does not exclude other elements and the indefinite article "a" or "an" does not exclude more than one. The fact alone that certain features are mentioned in various dependent claims does not restrict the subject matter of the invention. Combinations of these features can also be advantageously used. The reference signs in the claims are not intended to restrict the scope of the claims. The figures are not to be understood as true to scale but are only of a schematic and illustrative character. In the figures:

FIG. 2a shows a perspective view of an aircraft structure to which a riblet film according to FIG. 1 has been applied, in a first magnetic situation, FIG. 2b shows a perspective view of a structure to which a riblet film according to FIG. 1 has been applied, in a second magnetic situation.

DETAILED DESCRIPTION OF THE PREFERRED EMBODIMENTS

Figure 1A:
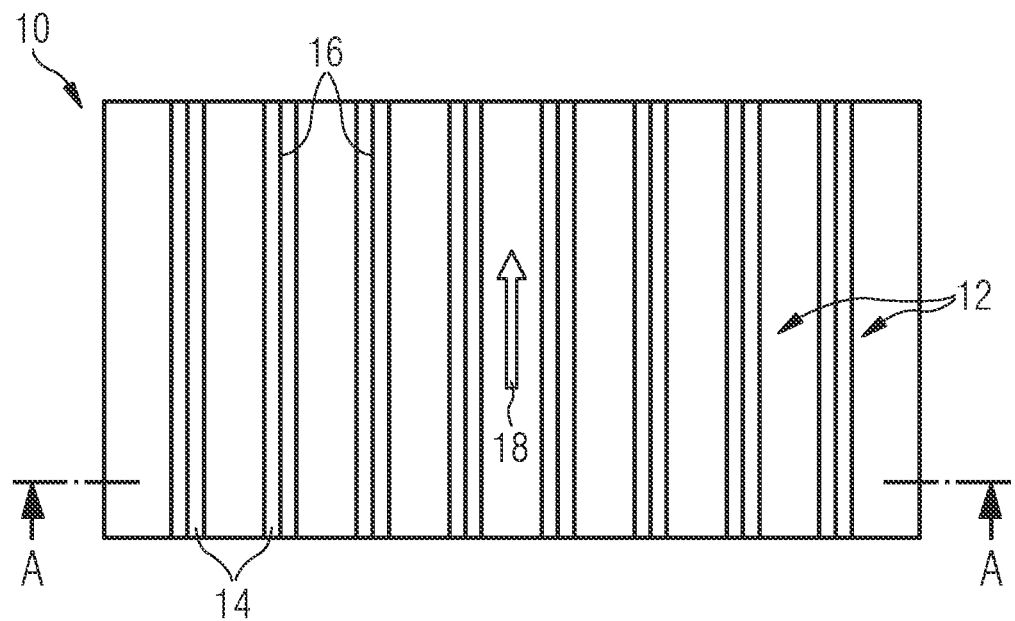
FIG. 1a shows a plan view of an embodiment according to the invention of a riblet film on the riblet side.
Figure 1B:
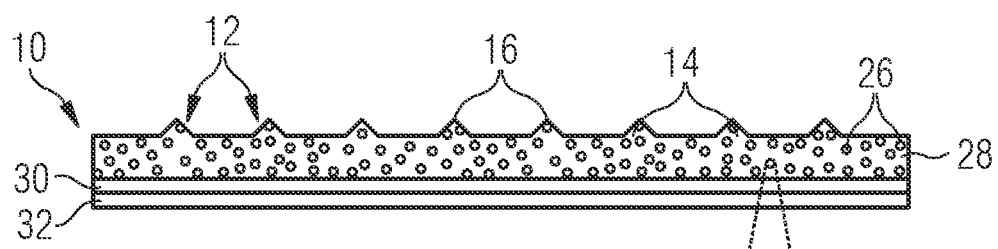
FIG. 1b shows a cross section through the riblet film according to FIG. 1a along the line A-A.
Figure 1C:
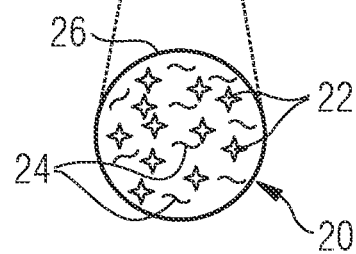
FIG. 1c shows an enlarged cutout of a detail from FIG. 1b.

FIG. 1a to FIG. 1c show a riblet film 10 for reducing the air resistance of aircraft. The riblet film 10 has on one side an arrangement of a plurality of profiled bodies (the so-called riblets 12), which are formed as ribs 14 or grooves. The riblets 12 are arranged substantially parallel to one another and have a triangular cross section with tips 16 formed in each case at the ends. The riblets 12 or the riblet film 10 is/are typically aligned or arranged in such a way that they run substantially parallel to the direction of flow 18. The use of riblets 12 or riblet films 10 on aerodynamic surfaces of aircraft serves for reducing the flow resistance, and thereby reducing the fuel consumption (cf. FIG. 4).

The riblet film 10 comprises a suspension 20 with magnetic particles 22 enclosed therein (cf. the cutout of a detail in FIG. 1c). The suspension 20 is a substance with a carrier liquid 24 and the magnetic particles 22 contained therein. The suspension 20 is in this case distributed among a multiplicity of microcapsules 26, which are arranged in a layer 28 of the riblet film 10 and in which the suspension 20 with the magnetic particles 22 is enclosed. In other words: the riblet film 10 comprises a layer 28 with a multiplicity of microcapsules 26, wherein the suspension 20 is distributed in a plurality of partial amounts among the microcapsules 26 and respectively enclosed therein. The magnetic particles 22 may, for example, be colloidal nickel and the carrier liquid 24 may, for example, be oil or a gelatinous liquid, which makes it possible for the magnetic particles 22 to be kept in a freely rotatable manner in the carrier liquid 24.

The layer 28, which comprises the microcapsules 26, has been applied to a substrate 30, which serves as a carrier film. The riblet film 10 also has, on the side of the riblet film 10 opposite from the riblets 12, an adhesive layer 32 for adhesively attaching the riblet film 10 onto an aerodynamic surface.

In FIG. 2a and FIG. 2b there is shown as a cutout, and by way of example, an aircraft structure 34 on the aerodynamic surface 36 of which the riblet film 10 has been applied (for example by means of the adhesive layer 32). For the sake of better understanding, in FIGS. 2a and 2b the riblets 12 and the layers 30, 32 are not shown. In FIG. 2a, the aircraft structure 34 is undamaged, or the aircraft structure 34 has no structural irregularity. In FIG. 2b, the aircraft structure 34 has a structural irregularity 38 (as a structural irregularity 38, there may, for example, be a crack in the aircraft structure 34).

By introducing a magnetic field 40',40" locally into the structure 34 by means of a magnet that is not shown in FIGS. 2a and 2b, the corresponding magnetic field 40',40" acts locally on the aircraft structure 34 to be examined, and the different patterns represented by the field lines of the magnet field 40',40" occur in the aircraft structure 34, or directly in the region of the surface 36, as a result of the presence or absence of the irregularity 38 or the crack (FIG. 2b or 2a).

The magnetic situations characterized by the different patterns of the field lines of the magnetic field 40',40" are made visible by the riblet film 10, since, depending on the pattern of the magnetic field 40',40" acting on the riblet film 10, the magnetic field 40',40" that is acting can be made visible, at least in certain regions, by changing the orientation of the magnetic particles 22. They are made visible because the suspension 20 with the magnetic particles 22 enclosed therein acts as a flux detector. The freely rotatable particles 22 are oriented depending on the angle at which the externally generated magnetic field 40',40" impinges on the freely rotatable magnetic particles 22. Depending on the angle of impingement, the magnetic particles 22 orient themselves locally in such a way that they only reflect a smaller part or a greater part of light. In this way, the riblet film 10 looks locally darker or brighter and there are brightness variations that are characteristic of the respective magnetic situation 40',40" and can be inferred from the outer appearance of the riblet film 10.

On the basis of the different pattern of the field lines of the magnetic field 40',40" made visible by the riblet film 10, the presence or absence of irregularities 38 (for example, cracks) in the aircraft structure 34 can be deduced. This advantageously allows the aircraft structure 34 lying underneath the riblet films 10 to be inspected for irregularities 38, for example for maintenance purposes of the aircraft.

Figure 3:
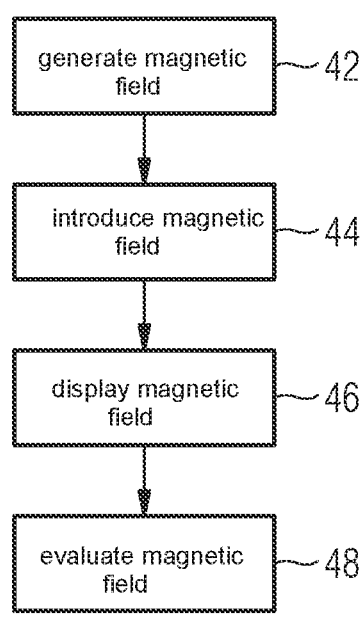
FIG. 3 shows a sequence of method steps of a method for examining an aircraft structure to which a riblet film has been applied.

In FIG. 3, the method for examining the aircraft structure 34 to which a riblet film 10 has been applied is schematically shown. It comprises the following method steps: first, in a first step 42, a magnetic field 40 is generated, then, in a second step 44, the magnetic field 40 is introduced locally onto or into the aircraft structure 34 to be examined (i.e., the magnetic field 40 is made to act locally). As a result, in a further step 46, the generated magnetic field 40 is displayed by means of the riblet film 10 or visible. Finally, the magnetic field 40 displayed is evaluated in a last step 48. For the evaluation, the actual magnetic field 40" displayed may be compared with a desired magnetic field 40'.

Figure 4:
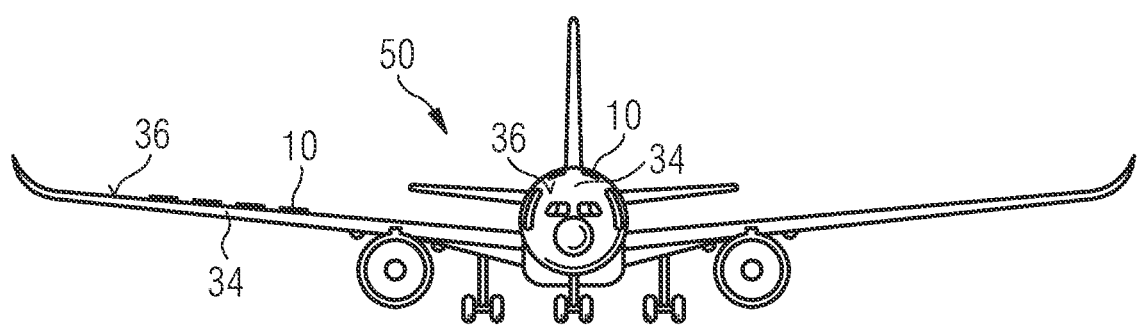
FIG. 4 shows a front view of an aircraft with a riblet film.

FIG. 4 finally shows an aircraft 50 with a riblet film 10, which has been applied to an aerodynamic surface 36 of the aircraft 50. The aircraft 50 or the aircraft structure 34 located under the aerodynamic surface 36 can be investigated, for example for cracks, through the riblet film 10 by locally introducing a magnetic field 40',40" into the surface region of the aircraft structure 34.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A riblet film for reducing air resistance of an aircraft, comprising:
   a suspension comprising a carrier liquid with rotatable magnetic particles enclosed within the carrier liquid,
   wherein, a magnetic field configured to act on the riblet film will be rendered at least partially visible by an orientation of the magnetic particles.

2. A riblet film for reducing air resistance of an aircraft, comprising:
   a suspension comprising a carrier liquid with rotatable magnetic particles enclosed within the carrier liquid,
   wherein, a magnetic field configured to act on the riblet film will be rendered at least partially visible by an orientation of the magnetic particles,
   wherein the riblet film comprises a layer with a multiplicity of microcapsules, wherein the suspension is distributed among the microcapsules and respectively enclosed therein.

3. The riblet film according to claim 1, wherein the magnetic particles comprise colloidal nickel.

4. The riblet film according to claim 2, wherein at least one of the suspension or a layer comprising the microcapsules is applied to a substrate serving as a carrier film.

5. The riblet film according to claim 1, wherein the riblet film comprises a plurality of ribs which are arranged substantially parallel to one another and have tips.

6. The riblet film according to claim 1, wherein the riblet film comprises a plurality of riblets each having a substantially triangular cross section.

7. The riblet film according to claim 1, wherein the riblet film further comprises has an adhesive layer arranged to adhesively attach the riblet film onto an aerodynamic surface.

8. An aircraft with a riblet film according to claim 1 applied to an aerodynamic surface of the aircraft.

9. A method for examining an aircraft structure to which a riblet film according to claim 1 has been applied, comprising the following method steps:
   generating a magnetic field,
   making the magnetic field act locally on the aircraft structure to be examined,
   displaying the generated magnetic field by means of the riblet film, and
   evaluating the magnetic field displayed.

10. The method according to claim 9, wherein the evaluation of the magnetic field displayed comprises a comparison with a desired magnetic field.

11. The riblet film according to claim 1, wherein the carrier liquid is an oil.

12. The riblet film according to claim 1, wherein the carrier liquid is gelatinous.

13. The riblet film according to claim 2, wherein the magnetic particles comprise colloidal nickel.

14. The riblet film according to claim 2, wherein the riblet film comprises a plurality of ribs which are arranged substantially parallel to one another and have tips.

15. The riblet film according to claim 2, wherein the riblet film comprises a plurality of riblets each having a substantially triangular cross section.

16. The riblet film according to claim 2, wherein the riblet film further comprises has an adhesive layer arranged to adhesively attach the riblet film onto an aerodynamic surface.

17. An aircraft with a riblet film according to claim 2 applied to an aerodynamic surface of the aircraft.

18. A method for examining an aircraft structure to which a riblet film according to claim 2 has been applied, comprising the following method steps:
   generating a magnetic field,
   making the magnetic field act locally on the aircraft structure to be examined,
   displaying the generated magnetic field by means of the riblet film, and
   evaluating the magnetic field displayed.

19. The method according to claim 18, wherein the evaluation of the magnetic field displayed comprises a comparison with a desired magnetic field.

20. The riblet film according to claim 2, wherein the carrier liquid is one of an oil or gelatinous.

* * * * *